3,352,691
PREVENTION OF PINK COLOR IN
WHITE ONIONS
Kwoh H. Li, Chicago, Robert H. Bundus, Riverside, and Peter P. Noznick, Evanston, Ill., assignors to Beatrice Foods Company, Chicago, Ill., a corporation of Illinois
No Drawing. Filed June 19, 1964, Ser. No. 376,577
23 Claims. (Cl. 99—154)

ABSTRACT OF THE DISCLOSURE

A method to prevent the formation of pink color in comminuted white onions by adding cysteine thereto and heating the mixture to a temperature of 160–190° F.

---

This invention relates to composition and method for treating plant tissue and to the resulting product and more particularly to the prevention of discoloration of comminuted plant tissue.

It is well known that numerous kinds of comminuted plant tissue when exposed to various media undergo discoloration in relatively short periods of time, thus reducing substantially their original advantageous appearance. This in turn affects seriously their market potential. Such a problem is graphically illustrated in the case of plant tissue, such as that of white onions, which tends to discolor to a red or pink hue after processing techniques to provide the onion in a dehydrated or puree form. The results of investigation into the causes of such discoloration have been reported in two dissertations by Joslyn and Peterson in the "Journal of Agricultural and Food Chemistry," volume 6, pp. 754 to 765 and volume 8, pages 72–76. According to these articles, various systems were implemented to isolate the causes of the discoloration phenomenon as well as the pigment itself, although no practical or effective solutions to the problem are advanced by the authors. Others also have concerned themselves with a solution of overcoming the disadvantageous effects of discoloration in plant tissue. For instance, in U.S. Patent 2,298,933, it has been proposed to apply to the surface an aqueous thiosulfate solution substantially free from sulfur dioxide. In U.S. Patent 2,583,686, a plant food is contacted with a water solution of a substantially colorless blue fluorescent material such as soluble organic sulfonic acid compounds, hydroxy coumarins and hydroxy coumarones to enhance the whiteness and esthetic appearance of a substantially white plant tissue.

Others have also investigated means to treat plant tissue, such as onions, to retard or inhibit their deterioration. Thus, Olcott et al., in U.S. Patent 2,652,332, proposes the addition thereof of an antioxidant such as 2-amino-3-hydroxy-benzoic acid or its esters. Investigators have also proposed treating various plant tissues with various agents to improve their essential characteristics. Thus, Campbell et al. in U.S. Patent 2,709,657, suggest stabilizing dehydrated onions with various antioxidants; Marks in U.S. Patent 2,715,582, treats onions by maintaining on the surface thereof an iodide and periodically treating the onion with a non-corrosive gas of oxidizing character; in U.S. Patent 2,759,827, Griffin treats green onions with citric acid to inhibit their deterioration, while Robbins in U.S. Patents 2,819,972 and 2,819,973 teaches treating plant tissue with a water solution of cinnamate ions and naphthol and a water solution of cinnamate ions, respectively; Melnick in U.S. Patent 2,910,368 suggests the use of ethylenediamine tetraacetic acid in onion containing products while ascorbic and sorbic acid are suggested by Weaver in U.S. Patent 2,992,114, to prolong the original characteristics of vegetables such as onions; Schroeder proposes in U.S. Patent 3,025,171, improving dehydrated onions with irradiation procedures and Evans in U.S. Patent 3,037,866, immerses a comminuted onion in a mixture of iodine, vegetable oil and sulfur.

As can be seen, a number of methods and compositions have been advanced heretofore for treating plant tissue, especially onions, yet the problem of reducing or substantially eliminating, practically, the discoloration of comminuted onions has remained essentially unsolved until the instant development which contributes to the art a long desired answer to the discoloration phenomenon.

It is therefore a principal object of the present invention to provide a novel composition which effectively inhibits the discoloration of comminuted plant tissue.

Another object of this invention is to provide a composition useful for treating comminuted onions which will cause the treated onion to retain its original characteristics.

A further object of this invention is to provide a composition for treating white onions which will cause the same to retain their whiteness and which is substantially colorless, odorless and systematically harmless.

A still further object of this invention is to provide a composition of the class described that will not materially affect the natural flavor of the product treated when used in accordance with this invention and which may be used economically.

Yet a further object of this invention is to provide a process for treating plant tissue to inhibit undesirable discoloration thereof.

A still further object of this invention is to provide food processors with means to inhibit the discoloration of comminuted onions in the preparation of a puree or dehydrated product therefrom.

A more specific object is to provide an edible product containing comminuted onion which is substantially free from discoloration.

Other objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by treating comminuted white onion tissue with cysteine. For use with the present invention cysteine can be used as the free base, i.e. with the primary amino group thereof unsubstituted or it can be used as the acid addition salt, that is, with an acid attached to its primary amino group. Examples of such operative acid addition salts are the mineral acid addition salts such as hydrohalide, e.g. hydrochloride and the sulfate or sulfuric acid addition salt. Cysteine having crystals of the d- and l- forms as well as of the racemate form can be employed. It has been found that cysteine, oxidized to cystine, is not operable in the instant invention.

Advantageously, cysteine is admixed with comminuted plant tissue prior to other processing techniques to produce comestibles in final form. The instant invention is particularly useful in the preparation of comestibles containing onion in finely divided form such as dehydrated onion-containing products or onion in puree form. When included in such products, cysteine generally, is present in amounts of 0.05 to 0.5 percent by weight of the total product, preferably, about 0.1 to 0.3 percent.

Additionally, an antioxidant such as citric or ascorbic acid can also be employed in the novel composition of this invention and when used it is generally present in amounts up to 0.3 percent by weight of the final product. Advantageously, the antioxidant is present in amounts of about 0.1 weight percent. The antioxidant is most effective at a pH of 3.0 to 6.0.

To increase the pungency of the final product it has been found desirable to include in the novel composition of this invention propionaldehyde in amounts ranging from 0.02 to 0.1 weight percent based on the final product and preferably, about 0.05 weight percent.

Other ingredients can also be included in the final onion-containing product and in those instances, especially, when the final product is a puree comprising onion, salt in amounts up to 10% or even greater, if desired, can be employed as a preservative.

The process of this invention comprises generally, comminuting white onion tissue, contacting the comminuted tissue with cysteine, and processing the cysteine-containing comminuted tissue to produce a final product, the amount of cysteine added being present in amounts of 0.05 to 0.5 weight percent, preferably, 0.1 to 0.3 weight percent, of the final product.

Advantageously, in the preparation of a final product such as a puree, the comminuted tissue, after admixture with cysteine, is heated at a temperature and for a period of time sufficient to pasteurize the mixture and destroy the pathogens thereof. Generally, the temperature to which the mixture is heated ranges from about 160 to 190° F. for a period of about 5 to 240 seconds. Of course, shorter periods and higher temperatures can be employed and the choice of these conditions can be easily determined by those skilled in the art, consideration being given, of course, to such factors as avoidance of significant losses of desirable characteristics of the product that could occur because of prolonged exposure to elevated temperatures.

Preferably, in the production of a puree it has been found advantageous to incorporate into the comminuted plant tissue mixture an antioxidant, prior to and/or after any heat treatment thereof. Generally, the antioxidant can be any conventionally employed, citric acid and ascorbic acid being preferred. Preferably also, the antioxidant is added in amounts ranging from 0.05 to 0.3 weight percent and more preferably, 0.1 weight percent of the final product.

It has also been found that in the production of a puree, extended preservation characteristics can be achieved if salt is admixed with the comminuted plant tissue subsequent to a heat treating procedure. Generally, salt added in amounts up to about 10 weight percent, based on the weight of the puree can be added. Of course, an upper limit is not critical and the amount used will be dictated, generally, by the desired physical characteristics of the final product, such as taste. Effective results are achieved when the antioxidant is added to a product having a pH ranging from 3 to 6.

Other additives can also be incorporated into the final product to achieve predetermined results. Thus, it has been found that the incorporation of 0.02 to 0.1, preferably, 0.05 weight percent, based on the final product, of propionaldehyde effectively increases the pungency of the final product.

In the production of a dehydrated product it has been found advantageous to enzymatically digest the cellulosic fiber of the plant tissue after the pasteurization procedure described above. The cellulosic fiber of the plant tissue is enzymatically digested at a temperature generally ranging from about 120 to 130° F. for a period of time up to about thirty minutes or longer, if desired. Advantageously, an enzyme such as Cellulase 35 or 36 (Rohm and Haas) is added in amounts sufficient to digest the cellulose. Of course, the choice of a particular enzyme is clearly within the purview of those skilled in the art.

Subsequent to procedures to enzymatically digest the cellulosic fiber of the plant tissue pasteurization procedures are again conducted to destroy the enzymes previously added. Essentially, the same operational conditions, as noted above, prevail.

After the second heat treatment to destroy the enzymes, the comminuted plant tissue can be processed to produce a dehydrated product.

The following examples demonstrate the preferred embodiments of the invention in greater detail. It is to be understood, however, that these examples are furnished only by way of illustration and not limitation. Unless otherwise stated, all parts and percentages are by weight.

*Example I*

A batch of White Globe onions was washed and comminuted and to the mass there was added 0.05 weight percent 1-cysteine. The mass was then pasteurized at a temperature of 161° F. for 15 seconds and cooled to room temperature and reduced to the desired viscosity. The onions were white after 154 hours.

*Example II*

The same procedures outlined in Example I were followed except that 0.3 weight percent 1-cysteine hydrochloride was employed. The onions were still white after 154 hours.

*Example III*

The procedure of Example I was employed using 0.3 weight percent of 1-cysteine. The onions were still white after 154 hours.

*Example IV*

The procedures of Example I were followed except that 0.3 weight percent d-, 1-cysteine sulfate was employed. The mixture had a pH of 3.0. The onions were still white after 154 hours.

*Example V*

The method of Example IV was repeated except that prior to the heat treating procedure, i.e. the pasteurization process, 0.3 weight percent of citric acid was added to the comminuted onions.

*Example VI*

The process of Example V was repeated except that 0.05 weight percent ascorbic acid was employed rather than citric acid.

*Example VII*

The method of Example IV was repeated except that subsequent to pasteurization process, salt in amounts of 10 weight percent was added as well as 0.1 weight percent propionaldehyde.

*Example VIII*

A batch of White Globe onions was washed and comminuted and to the mass was added 0.15 weight percent d-cysteine, and 0.1 weight percent citric acid, the mixture being at a pH of 4.5. The mixture was then pasteurized at a temperature of 161° F. for 15 seconds to destroy the pathogens contained therein. Subsequently, there was added to the mass Cellulase 36 followed by heating to 120 to 130° F. for 30 minutes to enzymatically digest the cellulosic bacteria of the onions. The mass was then pasteurized a second time at 190° F. for 15 seconds to destroy the enzymes and to the essentially enzyme-free mass there was added 0.05 weight percent propionaldehyde. The mass was then spray dried to produce a dehydrated product.

It is claimed:

1. A method for inhibiting discoloration of comminuted white onions comprising applying cysteine material thereto and heating the resulting mixture to a temperature between 160–190° F.

2. The method of claim 1 wherein the cysteine is selected from the group consisting of cysteine per se and the acid addition salts thereof.

3. The method of claim 2 wherein the cysteine material is cysteine sulfate.

4. The method of claim 2 wherein the cysteine material is cysteine as the free base.

5. The method of claim 2 wherein the cysteine material is cysteine hydrochloride.

6. The method of claim 1 wherein the cysteine material is present in amounts of 0.05 to 0.5 weight percent of the plant tissue.

7. The method of claim 6 wherein the cysteine is present in amounts of 0.1 to 0.3 weight percent.

8. A method for the production of a puree from white onion tissue comprising in combination, comminuting said onion tissue, admixing with said comminuted tissue cysteine in amounts of 0.05 to 0.30 weight percent of said puree, heating said mixture to a temperature sufficient to destroy pathogens contained therein, and reducing the particle size of said mixture to produce a puree of a predetermined viscosity.

9. The method of claim 8 which includes admixing an antioxidant to the cysteine-containing mixture prior to heating said mixture.

10. The method of claim 9 which includes admixing a preservative to the mixture subsequent to the heating procedures.

11. The method of claim 9 which includes admixing propionaldehyde to said puree.

12. A method for the production of a puree from white onions substantially free from discoloration comprising comminuting said onions, admixing with said comminuted onions cysteine material selected from the group consisting of d-cysteine, l-cysteine, d-,l-cysteine, d-,l-cysteine sulfate, d-cysteine sulfate, l-cysteine sulfate, l-cysteine hydrochloride, d-cysteine hydrochloride and d-,l-cysteine hydrochloride in amounts of 0.1 to 0.30 weight percent based on said puree, admixing with said cysteine-containing comminuted onion an antioxidant in amounts of 0.05 to 0.30 weight percent based on said puree, pasteurizing said mixture at a temperature of 160 to 190° F., admixing with said pasteurized mixture a preservative in amounts up to about 10 weight percent of said puree and reducing the particle size of the preservative-containing mixture to produce a puree of a predetermined viscosity.

13. An onion puree comprising comminuted white onion and cysteine in amounts of 0.05 to 0.50 weight percent of said puree.

14. The puree of claim 13 wherein the cysteine material is selected from cysteine per se and the acid addition salts thereof.

15. The puree of claim 14 wherein cysteine material is cysteine per se.

16. The puree of claim 14 wherein cysteine is cysteine sulfate.

17. The puree of claim 14 wherein cysteine is cysteine hydrochloride.

18. A method for producing dehydrated white onion substantially free from discoloration comprising comminuting said onion, admixing with said comminuted onion cysteine material in amounts of 0.05 to 0.50 weight percent based on said dehydrated onion, admixing to said cysteine-containing comminuted onion an antioxidant selected from the group consisting of citric and ascorbic acid in amounts of 0.05 to 0.30 weight percent based on said dehydrated onion, pasteurizing said mixture at a temperature of 160 to 190° F., cooling said mixture, admixing to said mixture an enzyme, heating said enzyme-containing mixture to a temperature of 120 to 130° F. to enzymatically digest the cellulosic fiber of said onion, pasteurizing the enzyme-containing mixture at a temperature of 160 to 190° F. and dehydrating said mixture to produce dehydrated onion.

19. The method of claim 18 wherein the cysteine material is selected from the group consisting of cysteine per se and the acid addition salts thereof.

20. The method of claim 19 wherein the cysteine is l-cysteine.

21. The method of claim 19 wherein the cysteine is d-,l-cysteine sulfate.

22. The method of claim 19 wherein the cysteine is l-cysteine hydrochloride.

23. A dehydrated white onion comprising comminuted onion and cysteine material in amounts of 0.05 to 0.30 weight percent of said dehydrated onion.

References Cited

UNITED STATES PATENTS

| | | | |
|---|---|---|---|
| 2,615,814 | 10/1952 | Geary | 99—156 |
| 2,846,317 | 8/1958 | Bersworth et al. | 99—154 |
| 3,049,427 | 8/1962 | Fellers et al. | 99—154 |

OTHER REFERENCES

West et al., Textbook of Biochemistry 3rd ed. 1961, page 292.

Braverman, The Biochemistry of Foods, Elsever Pub. Co., 1963, pp. 246, 247.

HYMAN LORD, *Primary Examiner.*

A. LOUIS MONACELL, *Examiner.*

M. VOET, *Assistant Examiner.*